April 8, 1958  K. E. H. BACKMAN ET AL.  2,830,200
POWER SUPPLY
Filed April 14, 1954 2 Sheets-Sheet 1
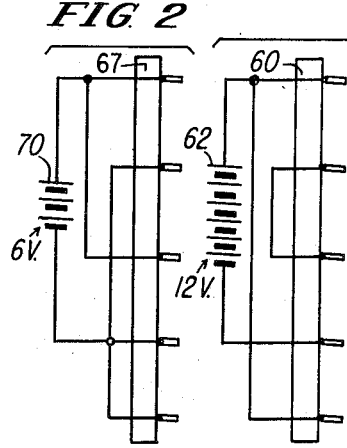
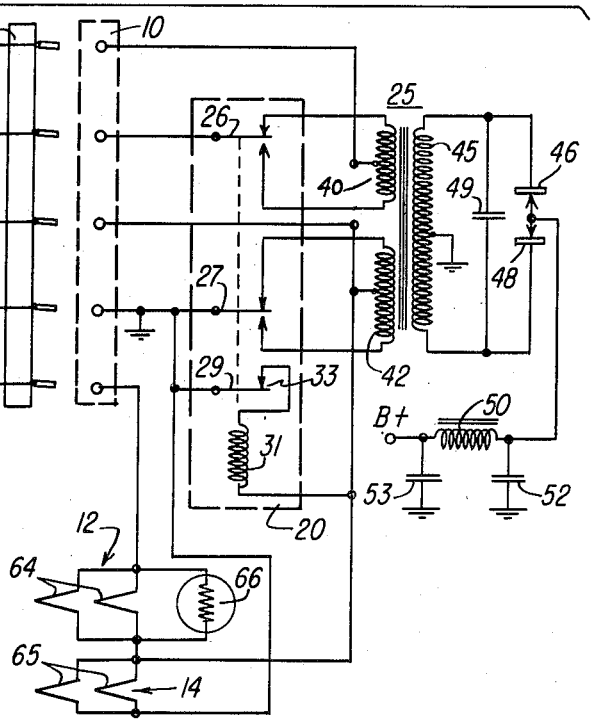
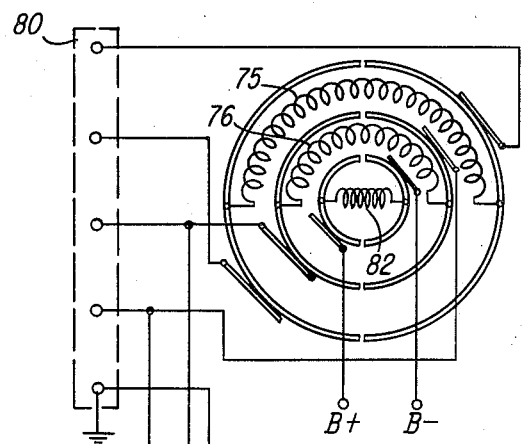
INVENTORS
Kenneth E. H. Backman
Glen R. Madland
BY
Mueller & Aichele
Attys.

April 8, 1958  K. E. H. BACKMAN ET AL  2,830,200
POWER SUPPLY
Filed April 14, 1954  2 Sheets-Sheet 2
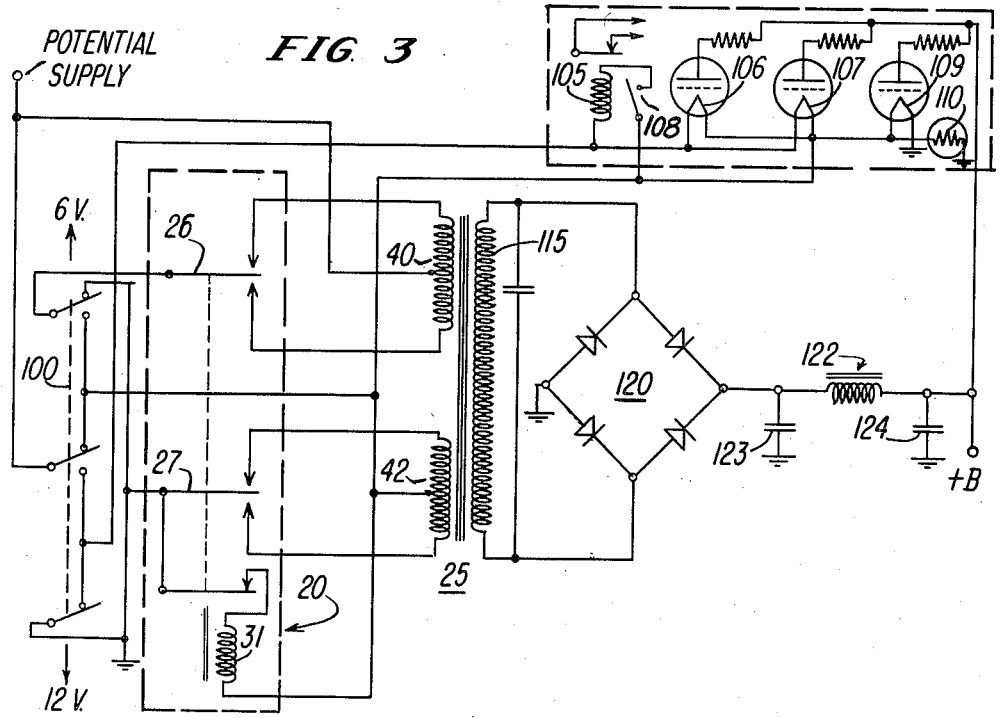
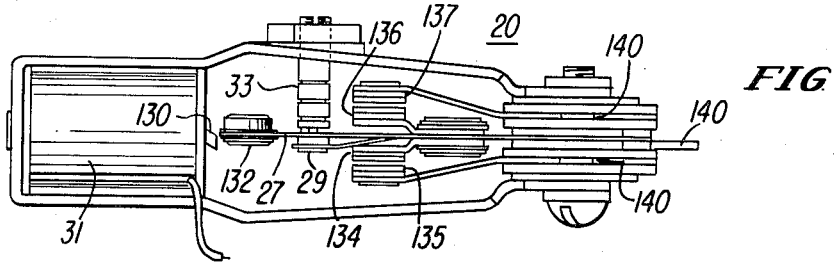
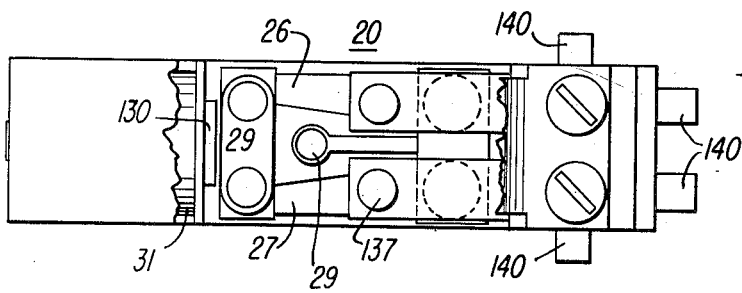
INVENTORS
Kenneth E. H. Backman
BY Glen R. Madland
Mueller & Aichele
Attys.

2,830,200

POWER SUPPLY

Kenneth E. H. Backman, Chicago, and Glen R. Madland, Elmhurst, Ill., assignors to Motorola, Inc., Chicago, Ill., a corporation of Illinois Application April 14, 1954, Serial No. 423,158

15 Claims. (Cl. 307—150)

This invention relates generally to power supplies, and more particularly to a direct current voltage transforming system which is easily adaptable for use with different supply voltages while maintaining a uniform output for an "A" supply as well as a "B" supply.

In providing a high voltage direct current source for electronic equipment, it is known to employ a comparatively low voltage direct current source which is transformed to the desired high voltage by converting it to a pulsating current, passing it through a transformer and then rectifying it. After filtering, a high voltage supply is available which is suitable for operation of radio receivers, transmitters and the like.

The low voltage or "A" supply for tube filaments, relays and the like used in such equipment is generally supplied directly by the low voltage source to various series and for parallel wiring combinations of these items.

Since many of the vehicles today utilize a storage battery to supply an associated electrical system, it is general practice to employ this battery to provide the power source for electronic equipment installed in such vehicles. However, not all of these vehicular electrical systems have potential supplies of the same value. For example, some autos have a six volt system while other autos and many trucks have a 12 volt system. Therefore various power converting devices are necessary so that a given piece of electronic equipment may be used in vehicles having these different voltage supplies. To overcome the need for such converting devices it is desired to provide a single power unit which may be installed in such electrical systems with a minimum of change in circuitry.

Therefore, it is an object of the present invention to provide an improved vibratory power supply system which may be simply and easily adapted for operation on more than one supply voltage.

It is another object of the invention to provide an improved power supply system which delivers a desired B supply to associated electronic apparatus as well as a fixed A supply for tube filaments and the like in the apparatus when the system is operated from either one of two supply potentials.

A further object of the invention is to provide a simple and inexpensive vibratory interrupter system which utilizes the same vibrator structure and the same transformer windings and provides the same current therethrough to supply a given output when operated from either one of two different voltage sources.

A feature of the invention is the provision of a vibratory transforming means for producing a high direct current voltage from lower direct current voltage sources which transforming means has a pair of inductors incorporated therewith, and two sets of A coupling means with a set connected across each inductor. These parallel systems are series connected to the voltage source for one mode of operation, and are all connected directly across the voltage for another mode of operation, so that in either case the output from a secondary inductor associated with the primary inductors will be constant. The potential existing in either set of A coupling means will remain substantially constant with variation in load because of the transformer action between the primary inductors.

Another feature is the provision of a power supply system operable from either of two different supply potentials which utilizes a vibrator and a pair of transformer windings series connected for the higher voltage supplies and parallel connected for the lower voltage supply with A supply connections made in parallel for the lower supply potential and in series parallel across the transformer winding for the higher voltage, wherein the connections for providing the desired mode of operation are made through the cable connecting the system to the supply potential.

Still another feature of the invention is the provision of a vibratory power supply with a pair of vibrator interrupters and a pair of transformer primary windings and switch means to connect them in parallel relation for operation from one voltage supply and in series relation for operation from a second voltage supply which is twice the value of the former. In this system the interrupter and transformer windings carry substantially the same current to provide a given load when operating from either supply voltage.

Further objects, features and the attending advantages thereof will be apparent upon consideration of the following description when taken in conjunction with the accompanying drawings in which:

Fig. 1 is a schematic diagram of the vibrator circuit;

Fig. 2 is a schematic diagram of an alternate battery circuit;

Fig. 3 is a schematic diagram of the vibrator circuit using switch means to change the circuit for a different voltage supply source;

Fig. 4 is a view of a vibrator structure suitable for use as a circuit;

Fig. 5 is a cut-away view showing the constructional details of the vibrator structure; and Fig. 6 is a schematic diagram of the circuit using a dynamotor.

In practicing the invention, there is provided an energy converting system adapted to be operated from power sources of different voltages by the simple change of a connecting plug or switch means. A direct current voltage transforming means is provided such as a vibrator and transformer system or a dynamotor. The pair of input windings in the transforming means are series connected to a supply potential of a first value or parallel connected to a supply potential of one-half this value. Thus a uniform output is obtained with either voltage supply. Low voltage or A supply for tube filaments, pilot lamps and the like in the apparatus which the system supplies, is provided by a parallel connection for the one-half value supply, and two parallel groups with one group coupled across each input winding is used for the higher potential supply. Thus any variation in the current requirements of the two groups of low voltage circuits is compensated by the transformer action of the input windings.

Referring now to Fig. 1, connector receptacle 10 is shown wired to a vibrator type power supply and a pair of low voltage circuits 12 and 14. The vibrator power supply consists of a vibrator structure 20 and a transformer 25. The vibrator structure includes vibrator arms 26 and 27 each engageable with a pair of contacts associated therewith and on opposite sides of these arms. The arms 26 and 27 are ganged together and also to a further vibrator arm 29 to form an armature which may be attracted by conduction of current through the magnetic coil 31. In the unattracted position of the armature, the arm 29 makes contact with vibrator contact 33 which is connected to the magnetic coil 31 so that the contact is broken when arm 29 is attracted by the magnetic coil 31.

Transformer 25 includes a center tapped primary winding 40 connected across the contacts associated with vibrator arm 26 and center tapped primary winding 42 connected across the contacts associated with vibrator arm 27. There is also a secondary winding 45 included in the transformer, and this has a grounded center tap and is coupled to a pair of rectifiers 46 and 48 in a known rectifier circuit with buffer condenser 49 connected thereacross. The output from the rectifier is coupled through filter choke 50 to the B plus terminal and is further filtered by capacitors 52 and 53.

Turning now to the potential supplying portion of the circuit, there is shown connector means 60 which is constructed to engage and make electrical contact with the terminals in connector receptacle 10. A battery 62 is connected to the connector means and it may be seen that completing a connection through the connector means and the receptacle establishes a circuit which will now be described. A series connection is made across the battery 62 consisting of a portion of primary winding 40 through the center tap thereof, vibrator arm 26 through engagement thereof with one of its associated contacts, a portion of primary winding 42 through the center tap thereof, and vibrator arm 27 through engagement thereof with one of its associated contacts. The vibrator arms are set in motion by a known method, namely through energizing coil 31 which causes vibration of the arm 29 which is mechanically engaged to move in unison with arms 27 and 26.

The method of applying an energizing potential to the coil 31 may be explained with reference to the low voltage circuits 12 and 14. Included in circuit 12 are parallel connections of vacuum tube filaments 64 and indicator lamp 66. This combination is series connected to low voltage circuit 14 including a parallel connection of vacuum tube filaments 65 and the magnetic coil 31. The series circuit combination is connected across the battery 62 through the connector and receptacle means. Therefore, it may be seen that with a given battery potential each of the low voltage circuit combinations will have impressed thereacross substantially one-half this potential value if circuits 12 and 14 have approximately the same resistance. Many vacuum tube filaments, indicator bulbs, relays and the like, require a potential of 6 volts. Thus if battery 62 supplies 12 volts each low voltage circuit may supply about 6 volts thereby allowing use of such standard components.

At the junction of the low voltage circuits 12 and 14, there is a connection to the center tap of primary winding 42. The purpose of this is to utilize the transformer primary windings to equalize the current flow in the two circuits so that the supply potential is equally divided between them. In practice the connection of components in these two circuits is made so that one-half of the potential supply appears across each low voltage circuit. However, since it is not always possible to employ indicator lamps, relays, and the like, in each of the circuits which allow exact balance of the voltage in these branches, the connection of the center point of this network of low voltage circuits is made to the potential center point of the circuit including the primary transformer windings. The applied potentials to the two portions of the low voltage circuit tend to be balanced by the auto-transformer action of the primary transformer winding.

It may be noted that as the vibrator arms 26 and 27 vibrate and engage their respective contacts, a pulsating direct current is introduced into the primary transformer windings 40 and 42 so that alternate portions of these windings on either side of their center tap are connected in series through the vibrator arms. By transformer action an alternating current will be introduced into the secondary 45 which is then rectified and filtered in a known manner to provide B plus potential for associated electronic equipment.

Fig. 2 shows a second connector means 67 which has a battery 70 coupled thereto. When the connector means 67 is inserted in receptacle 10, a change in the wiring of the power supply system results. The system will now be operative to produce the same B plus potential as in the previous circuit from a battery supply of one-half the value of the battery voltage utilized in that circuit. That is, in the embodiment shown, battery 70 may be a 6-volt supply which is one-half the value of the 12-volt battery 62. In this instance there is a parallel connection of a portion of primary winding 40 through its center tap connection through arm 26 and one of its associated contacts to ground. Similarly connected across the battery 70 is a portion of primary winding 42 through its center tap connection and vibrator arm 27 through one of its associated contacts to ground. Also it may be noted that each of the two branches of the filament circuit is connected in parallel across the voltage source 70. Since this source is 6 volts, the proper potential is applied to each branch of this circuit.

Both the windings 40 and 42 have corresponding portions connected in parallel as the vibrator arms vibrate so that the voltage induced in secondary winding 45 depends upon the number of turns of one of the primary windings as compared to the number of turns of the secondary windings. That this voltage induced in the secondary winding will be the same as that induced therein in the previously described circuit, is apparent upon consideration of the fact that in the former circuit, corresponding portions of the primary winding were connected in series but the voltage was double that which it is in this circuit. Therefore, the effective turns ratio in the circuit when the supply potential is one value (e. g. 6 volts) is reduced to one-half the former ratio when the supply potential is double that value (e. g. 12 volts). Thus the output potential across secondary winding 45, and therefore the B supply potential, remains uniform with either value of supply potential. Also when the lower value supply potential is utilized, the current carrying capacity of the primary windings is maintained at the proper level through the parallel connections of these windings.

In the circuit of Fig. 3 which is similar to that shown in Fig. 1, a 3-pole two-position switch 100 is used to effect the change from the 6 volt to the 12 volt operation. It may be noted that in the upper position of the arm of switch 100 the vibrator arms 26 and 27 are connected to ground and the center taps of primary windings 40 and 42 are connected to the supply potential and the relay coil 105, the electron valve filaments 106 and 107 and 109, along with indicator lamp 110 and the electromagnetic coil 31 are connected in parallel across this potential source. Operation of this circuit then will induce a voltage in the secondary winding 115 of transformer 25 which is determined by the turn ration of the number of turns from the center tap of a primary winding to one of its ends as compared to the number of turns on the secondary winding. This voltage induced in the secondary 115 of the transformer may be rectified in the known bridge rectifier circuit 120 and filtered by choke 122, capacitor 123 and 124 to produce a B+ potential suitable for operating associated electronic equipment.

Positioning of the switch arm of switch 100 in the downward position as shown in Fig. 3 will prepare the system for operation from a potential supply of twice that utilized when the switch is in the other position. This results in a series connection across the potential supply of the portion of the second primary winding 40 and its associated vibrator arm 26 and the portion of the primary winding 42 and its associated vibrator arm 27. One portion of the low voltage circuit is then connected across primary winding 40 and this includes the relay coil 105 with its operational switch 108 and the vacuum tube filaments 106 and 107. The second portion of the low voltage circuit including vacuum tube filament 109, indicator lamp 110, and the coil 31, are parallel connected across a portion of the primary winding 42. Therefore, as in the previous circuit, slight differences in the load current of these two circuits will not cause unbalance in the voltage drops, due to the auto-transformer action of the primary windings.

Figs. 4 and 5 show the physical arrangement of vibrator unit 20. There is a metallic core 130 within coil 31 so that when the coil is energized, movable armature 132 will be attracted downward. Operatively connected to the armature 132 are vibratory arms 29, 26 and 27 and as armature 132 moves downward arm 29 breaks the contact with contact 33 and contact 134 associated with arm 27 engages contact 135. As previously explained, when the contact between 33 and 29 is broken, coil 31 is no longer energized and arm 132 is returned through the resilience of arms 26 and 27 to the position shown in Fig. 4. Inertia carries contact 136 associated with arm 27 into engagement with contact 137 and the cycle begins anew. Associated with arm 26 are a pair of contacts corresponding to contacts 134, 135, 136 and 137 of arm 27. Since one terminal of the coil is connected to the frame of the unit, and thus to contact 33, the unit must be insulated from ground or minus potential. And, of course, the various arms and contacts are insulated from the frame and from one another except at their respective contacting points. Lugs 140 provide terminals for connection to the circuit.

Fig. 6 illustrates the circuit for use with a dynamotor to supply the high voltage direct current from the low voltage source. Primary armature coils 75 and 76 are connected through their respective commutators and brushes to terminals of the connector receptacle 80. The secondary armature coil 82 is connected through its associated commutator and brushes to the B+ and B− supply. The commutators interrupt the direct current applied thereto, which is transformed in the dynamotor to provide high voltage in the secondary. Any suitable magnetic field may be provided in which the armature coils may rotate.

Two low voltage circuits 87 and 89 may also be connected to the terminals of the receptacle 80. Connection of either connector 60 or connector 67 to the receptacle 80 results either in a series or parallel connection respectively of the armature coils of the dynamotor. That is, for the lower voltage supply the primary armature coils 75 and 76 are connected in parallel and for the higher voltage supply the windings are connected in series. Therefore, the output voltage induced in winding 82 will remain constant with either supply potential.

The two sections of the low voltage circuits 87 and 89 are here shown as parallel combinations including two vacuum tube filaments and a light bulb in each branch. As in the previously described circuit, these two branches are series connected for the higher supply potential and parallel connected for the lower supply potential through the circuitry of the connector and its receptacle. As in the previous circuit, the junction of the low voltage circuits in the series connection thereof is tied to the junction of primary windings 75 and 76 so that an unbalance of voltage across these branches will be compensated by transformer action through the windings.

Thus there has been provided a simple and inexpensive power supply system for use with portable and mobile equipment which furnishes uniform output from two different voltage supply sources. The completed unit occupies a minimum of space and possesses low weight since all portions of the transformer and vibrator structure are used during operation from either source.

The mere change of a switch or of a connection plug allows convenient and rapid alteration of the circuit for operation of the system from either of two supply potentials. "B" supply is maintained at the desired level as well as filament supply for either mode of operation. Therefore, the vacuum tubes, pilot lights, and even the vibrator unit, need not be changed with the different potential supply.

While a particular embodiment of the invention has been shown, it is understood that changes may be made and it is intended that the appended claims cover all such changes and modifications as fall within the scope of the invention.

What is claimed is:

1. An electrical energy converting system for supplying operational potentials to electronic equipment, including in combination, transforming means for producing a high direct current voltage from a lower direct current voltage, said transforming means having first and second interrupting means, first and second primary inductors and a secondary inductor, said primary inductors being individually connected to said interrupting means, a connector portion including at least first, second, third, fourth and fifth terminals, a first circuit including said first interrupter means and said first primary inductor connected between said first and second terminals, a second circuit including said second interrupting means and said second primary inductor connected between said third and fourth terminals, a first low voltage circuit connected between said third and fourth terminals, a second low voltage circuit connected between said third and fifth terminals, and rectifier means connected to said secondary winding for providing a high direct current potential for the equipment, whereby the connection of said second and third terminals, said first and fifth terminals and of a direct current supply potential of a given value across said first and fourth terminals produces, through auto-transformer action between said primary inductors, substantially the same operational potentials for the electronic equipment as the connection of said first and third terminals, said second, fourth and fifth terminals and of a direct current supply potential of one half said given value across said first and fourth terminals.

2. An electrical energy converting system including in combination, transforming means for producing a high direct current voltage from a lower direct current voltage, said transforming means having a pair of interrupting means, a pair of primary inductors and a secondary inductor inductively coupled to each other, means individually connecting said primary inductors to said interrupting means, direct current potential supply means, first and second low voltage coupling means, and circuit changing means with a first connection thereof connecting said primary inductors and said first and second low voltage coupling means in parallel relation across said potential supply means and a second connection thereof connecting a low voltage coupling means across each primary inductor and connecting said primary inductors in series relation across said potential supply means whereby tendency for unequal voltages in said low voltage coupling means is compensated by auto-transformer action of said primary inductors.

3. A voltage transforming system including in combination a dynamotor with two primary windings and a secondary winding, direct current potential supply means, first and second low voltage coupling means, and circuit connecting means with a first connection thereof connecting a low voltage coupling means across each primary winding and connecting said primary windings in series relation across said potential supply means, and a second connection thereof connecting said primary windings and said low voltage coupling means all in parallel relation across said potential supply means.

4. Electrical energy converting apparatus including in combination, an interrupter device including first and second sets of interrupter contacts, a transformer having first and second primary winding portions and a secondary winding, first and second circuits including said first and second sets of interrupter contacts and said first and second primary winding portions respectively, and switch means connecting said first and second circuits to a source of potential, said switch means being operative from a first position in which said circuits are connected in series to a second position in which said circuits are connected in parallel, so that a uniform output is provided at said secondary winding when said source of potential has a first value and said switch means is in said first position, and also when said source of potential has a value one half said given value and said switch means is in said second position.

5. An electrical energy converting system including in combination, interrupter means including first and second current interrupter portions, transformer means having first and second primary winding portions and a secondary winding, first and second circuits including respectively said first interrupter portion coupled to said first primary winding portion and said second interrupter portion coupled to said second primary winding portion, and connector means adapted to connect said first and second circuits in parallel relation with one another to a source of potential of a certain value, said conductor means also being adapted to connect said first and second circuits in series relation with one another to a source of potential of substantially said certain value, thereby providing a uniform output from said secondary winding with two different potential supply values.

6. An electrical interrupter system including in combination, potential supply connections, a circuit interrupter device having first and second vibrator arms each engageable with an associated set of contacts, a transformer having a secondary winding and first and second primary windings each having substantially the same number of turns and center tap connections therein, said first primary winding being connected across the first set of contacts and said second primary winding being connected across said second set of contacts, and connector means adapted to connect said first vibrator arm and the center tap connection of said first winding and also said second vibrator arm and the center tap connection of said second winding in parallel relation across said potential supply connections for operation from a potential supply of a certain value, said connector means also being adapted to connect said first and second vibrator arms and said center tap connections in series relation across said potential supply connections for operation from a potential supply of substantially twice the certain value.

7. An electrical interrupter system including in combination, potential supply means, first and second vibrator means operable in unison and each engageable with a pair of contacts associated therewith, said second vibrator means having a connection to said potential return; a transformer with a pair of windings, one winding connected across the contacts associated with the first vibrator means and having a first center tap, the other winding connected across the contacts associated with the second vibrator means and having a second center tap; and two position switch means connecting both of said vibrator means to a point of reference potential and said center taps to said potential supply means in a first position and connecting said first vibrator means to said second center tap and said first center tap to said potential supply means in a second position.

8. An electrical interrupter system including in combination potential supply means and a potential return, first and second interrupter means operable in unison and each engageable with a pair of contacts associated therewith, said second interrupter means having a connection to said potential return; a transformer with a pair of primary windings and a secondary winding, one of said windings being connected across the contacts associated with the first interrupter means and having a first center tap connected to said potential supply means, the other one of said windings being connected across the contacts associated with the second interrupter means and having a second center tap; first and second low voltage supply means having a common connection therebetween, said first low voltage supply means being coupled to said potential return and said common connection being coupled to said second center tap; and two position switch means with first, second and third portions, said first portion connecting said first interrupter means to said potential return in a first position and to said second center tap in a second position, said second portion connecting said potential supply means to said second center tap in a first position and to said second low voltage supply means in a second position, and said third portion connecting said second low voltage supply means to said potential return in a first position and opening this connection in a second position.

9. An electrical energy converting system including in combination, interrupter means including first and second current interrupter portions, transformer means having first and second primary winding portions and a secondary winding, first and second circuits including respectively said first interrupter portion in series relation with said first primary winding portion and said second interrupter portion in series relation with said second primary winding portion, a pair of low voltage circuits, and connector means for connecting said first and second circuits and said low voltage circuits in parallel relation with one another to a source of potential of a certain value, and for connecting said first and second circuits in series relation with one another to a source of potential twice the value of said certain value with one low voltage circuit connected across said first circuit and the other low voltage circuit connected across said second circuit, thereby providing a uniform output from said secondary winding, and said low voltage circuits with two different potential supply values.

10. Electrical energy converting apparatus including in combination, interrupter means having first and second current interrupter portions, a transformer having first and second primary winding portions and a secondary winding, and circuit means coupled to said first and second interrupter portions and said first and second primary winding portions and forming first and second circuits respectively with a common connection therebetween, a low voltage circuit coupled to said common connection and having first and second portions connected across said first and second circuits, said circuit means including connector means for connecting said first and second circuits in parallel relation with one another to a source of potential of a certain value and for connecting said first and second circuits in series relation with one another to a source of potential substantially twice said certain value, whereby uniform output is provided from said secondary winding and in said low voltage circuit with two different potential supply values.

11. Electrical energy converting apparatus for providing potentials of substantially fixed, relatively high and relatively low values from potential sources of different low values one of which is substantially twice that of another, said apparatus including in combination, potential supply means, interrupter means having first and second pairs of interrupter contacts and first and second arm portions for alternately engaging the contacts of said first and second pairs respectively, said first and second arm portions forming a first pair of common terminals, a transformer having a secondary winding and first and second primary windings, said primary windings having end terminals and center taps which form a second pair of common terminals, circuit means including portions connecting said end terminals of said first and second primary windings to said first and second pairs of interrupter contacts respectively to form first and second circuit portions, low voltage supply means including first and second portions having a common connection therebetween, said circuit means including a portion connecting said common connection to the terminals of one of said first and second pairs of common terminals, said circuit means including portions for connecting said first and second circuit portions in series and in parallel to said potential supply means, whereby fixed voltages are developed across said secondary winding and said portions of said low voltage supply means from sources of different values.

12. An electrical energy converting system for providing a relatively high voltage from one direct current source of relatively low voltage or from another direct current source having a voltage substantially twice that of said one source, said system including in combination, transformer means including first and second primary windings and a secondary winding inductively coupled thereto, each of said primary windings including a center terminal and end terminals, current interrupter means including first and second pairs of conductors and first and second common conductors intermittently in conducting relation with said conductors of said first and second pairs respectively, means connecting said end terminals of said first and second primary windings to said conductors of said first and second pairs respectively, input terminals connected to said center terminals of said primary windings and to said common conductors of said current interrupter means for connecting the converting system to a direct current source, said system including first and second circuits extending from said input terminals and each including one primary winding, said pair of conductors connected thereto and said common conductor cooperating therewith, whereby said input terminals may be connected to the one source with said circuits being effectively in parallel and to the other source with said circuits effectively in series.

13. An electrical energy converting system including in combination, transformer means including first and second primary windings and a secondary winding inductively coupled thereto, each of said primary windings including a center terminal and end terminals, vibrator means including first and second pairs of contacts and first and second arms individually cooperating therewith, said first and second arms being mechanically interconnected and electrically insulated from each other, means connecting said end terminals of said first and second primary windings to said contacts of said first and second pairs respectively, and input terminal means including separate input terminals connected to said center terminals of said primary windings and to said arms of said vibrator means for connecting the converting system to an electrical energy source, said input terminals being adapted to be connected in one manner to a source of one potential for effectively connecting said primary windings in parallel and to be connected in another manner to a source having a potential substantially twice said one potential for effectively connecting said primary windings in series.

14. An electrical energy converting system for providing a relatively high voltage from a first direct current source of relatively low voltage or from a second direct current source having a voltage substantially twice that of said first source, said system including in combination, transformer means including first and second primary windings and a secondary winding inductively coupled thereto, each of said primary windings including a center terminal and end terminals, vibrator means including first and second pairs of fixed contacts and first and second movable contacts individually cooperating therewith, said first and second movable contacts being mechanically interconnected to each other, circuit means connecting said terminals of said first and second primary windings and said contacts of said vibrator means to form first and second circuit portions, said first circuit portion including said first primary winding, said first pair of fixed contacts and said first movable contact, said second circuit portion including said second primary winding, said second pair of fixed contacts and said second movable contact, said circuit means being adapted to receive connector means for connecting the converting system to a direct current source so that said circuit portions are connected in parallel when operated from the first direct current source and are connected in series when operated from the second direct current source.

15. An electrical energy converting system including in combination, transforming means for providing a high direct current potential from a low direct current potential, said transforming means having first and second current interrupting means and first and second primary inductors individually connected to said current interrupting means, a secondary inductor inductively coupled to said first and second primary inductors, connecting means including first, second, third, and fourth connecting portions, a first circuit including said first interrupting means and said first primary inductor connected between said first and second connecting portions, a second circuit including said second interrupting means and said second primary inductor connected between said third and fourth connecting portions, whereby the interconnection of said second and third connecting portions and the application of a direct current supply potential of a given value across said first and fourth portions produces substantially the same potentials and currents in said current interrupting means and said inductors as the interconnection of said first and third connecting portions and the interconnection of said second and fourth connecting portions and the application of a direct current supply potential of one-half said given value across said first and fourth connecting portions.

References Cited in the file of this patent
UNITED STATES PATENTS

| Number | Name | Date |
|---|---|---|
| 529,152 | Zickerman | Nov. 13, 1894 |
| 1,276,934 | Lane | Aug. 27, 1918 |
| 2,251,302 | Stehlik | Aug. 5, 1941 |
| 2,347,165 | Aust | Apr. 25, 1944 |
| 2,420,609 | Mitchell | May 13, 1947 |
| 2,423,614 | Callahan | July 8, 1947 |
| 2,445,390 | Ellis | July 20, 1948 |
| 2,451,461 | Wise | Oct. 19, 1948 |
| 2,468,578 | Vladimer | Apr. 26, 1949 |
| 2,703,376 | Board | Mar. 1, 1955 |